(12) United States Patent
Yang et al.

(10) Patent No.: US 11,063,320 B2
(45) Date of Patent: Jul. 13, 2021

(54) TERMINAL BUSBAR

(71) Applicant: LG Chem, Ltd., Seoul (KR)

(72) Inventors: Heekook Yang, Troy, MI (US); Robert Merriman, Lynn Township, MI (US); Jivitha Siddharthan, Troy, MI (US)

(73) Assignee: LG Chem, Ltd., Seoul (KR)

( * ) Notice: Subject to any disclaimer, the term of this patent is extended or adjusted under 35 U.S.C. 154(b) by 186 days.

(21) Appl. No.: 16/242,058

(22) Filed: Jan. 8, 2019

(65) Prior Publication Data

US 2020/0220143 A1    Jul. 9, 2020

(51) Int. Cl.
| | |
|---|---|
| *H01M 50/502* | (2021.01) |
| *H01H 85/06* | (2006.01) |
| *H01H 85/11* | (2006.01) |
| *H01M 50/20* | (2021.01) |

(52) U.S. Cl.
CPC .......... *H01M 50/502* (2021.01); *H01H 85/06* (2013.01); *H01H 85/11* (2013.01); *H01M 50/20* (2021.01); *H01M 2200/103* (2013.01)

(58) Field of Classification Search
CPC .......... H01M 2/20; H01M 2/206; H01M 2/26; H01M 2/30; H01M 2/34; H01M 50/502; H01H 85/06; H01H 85/11
See application file for complete search history.

(56) References Cited

U.S. PATENT DOCUMENTS

| | | | |
|---|---|---|---|
| 2013/0052507 A1* | 2/2013 | Dechant | H01M 10/0486 |
| | | | 429/121 |
| 2013/0090000 A1 | 4/2013 | Zhao | |
| 2014/0315051 A1 | 10/2014 | Han et al. | |
| 2015/0349315 A1* | 12/2015 | Shope | H01M 2/20 |
| | | | 429/121 |
| 2018/0198172 A1 | 7/2018 | Choi et al. | |
| 2019/0245186 A1 | 8/2019 | Hong et al. | |

FOREIGN PATENT DOCUMENTS

| | | |
|---|---|---|
| KR | 101006470 B1 | 1/2011 |
| KR | 20160081016 A | 7/2016 |
| KR | 20170063267 A | 6/2017 |
| KR | 101800815 B1 | 11/2017 |
| KR | 20180091446 A | 8/2018 |
| KR | 20180136803 A | 12/2018 |

\* cited by examiner

*Primary Examiner* — Karie O'Neill Apicella
(74) *Attorney, Agent, or Firm* — Buckert Patent & Trademark Law Firm PC; John F. Buckert (57) ABSTRACT

A terminal busbar includes a first busbar portion having a coupling plate, and a second busbar portion having a top plate portion, and a fusible member coupled to and between the coupling plate and the top plate portion. The fusible member has a first portion with a groove or an aperture disposed therein. The terminal busbar further includes an overmolded thermoplastic layer encapsulating the first portion of the fusible member and the groove or the aperture. A thickness of the overmolded thermoplastic layer both above and underneath the fusible member is greater than a thickness of the fusible member to prevent secondary arcing.

15 Claims, 9 Drawing Sheets

USER PROVIDES FIRST AND SECOND BUSBAR PORTIONS AND A FUSIBLE MEMBER, THE FUSIBLE MEMBER BEING INTEGRALLY FORMED WITH AND COUPLED TO THE FIRST AND SECOND BUSBAR PORTIONS, THE FUSIBLE MEMBER HAVING A TOP SURFACE, A BOTTOM SURFACE, AND A FIRST PORTION WITH AN APERTURE EXTENDING THERETHROUGH

802

OVERMOLDING DEVICE OVERMOLDS A THERMOPLASTIC LAYER ON THE FIRST PORTION OF THE FUSIBLE MEMBER SUCH THAT THE THERMOPLASTIC LAYER ENCAPSULATES THE FIRST PORTION AND THE APERTURE, THE THERMOPLASTIC LAYER HAVING A FIRST THERMOPLASTIC PORTION DISPOSED ON THE TOP SURFACE OF THE FUSIBLE MEMBER, AND A SECOND THERMOPLASTIC PORTION DISPOSED ON THE BOTTOM SURFACE OF THE FUSIBLE MEMBER, A THICKNESS OF THE FIRST THERMOPLASTIC PORTION BEING GREATER THAN OR EQUAL TO THE THICKNESS OF THE FUSIBLE MEMBER ALONG AN AXIS, THE AXIS EXTENDING THROUGH THE THERMOPLASTIC LAYER AND THE FUSIBLE MEMBER AND IS PERPENDICULAR TO THE TOP AND BOTTOM SURFACES OF THE FUSIBLE MEMBER, A THICKNESS OF THE SECOND THERMOPLASTIC PORTION BEING GREATER THAN OR EQUAL TO THE THICKNESS OF THE FUSIBLE MEMBER ALONG THE AXIS

FIG. 19

TERMINAL BUSBAR

BACKGROUND

The inventors herein have recognized a need for an improved terminal busbar. If a terminal busbar conducts an excessive current from the battery module for an extended time interval, the battery module may be damaged. Further, a portion of a terminal busbar may melt and become dislodged from the remaining portion of the terminal busbar into the air. Still further, the inventors herein have recognized that when a portion of the terminal busbar melts, secondary arcing may occur between a melted portion of the terminal busbar and a remaining portion of the terminal busbar.

The inventors herein have recognized that it would be advantageous to have a terminal busbar that protects a battery module from an excessive current condition for an extended time period by transitioning to an open electrical state, and to prevent melted portions of the terminal busbar from being dislodged from the terminal busbar into the air during the excessive current condition, and to prevent secondary arcing between a melted portion of the terminal busbar and a remaining portion of the terminal busbar.

SUMMARY

A terminal busbar in accordance with an exemplary embodiment is provided. The terminal busbar includes a first busbar portion having a coupling plate. The terminal busbar further includes a second busbar portion having a top plate portion and first and second side plate portions coupled to and extending downwardly from the top plate portion. The terminal busbar further includes a fusible member coupled to and between the coupling plate of the first busbar portion and the top plate portion of the second busbar portion and being electrically conductive. The fusible member having a top surface, a bottom surface, and a first portion with a groove or an aperture extending therethrough. The terminal busbar further includes an overmolded thermoplastic layer encapsulating the first portion of the fusible member and the groove or the aperture. The overmolded thermoplastic layer having a first thermoplastic portion disposed on the top surface of the fusible member, and a second thermoplastic portion disposed on the bottom surface of the fusible member. A thickness of the first thermoplastic portion is greater than or equal to the thickness of the fusible member along an axis. The axis extends through the overmolded thermoplastic layer and the fusible member and is perpendicular to the top and bottom surfaces of the fusible member. A thickness of the second thermoplastic portion is greater than or equal to the thickness of the fusible member along the axis.

A method for manufacturing a terminal busbar in accordance with another exemplary embodiment is provided. The method includes providing first and second busbar portions and a fusible member. The fusible member is integrally formed with and coupled to the first and second busbar portions. The fusible member has a top surface, a bottom surface, and a first portion with a groove or an aperture disposed therein. The method further includes overmolding a thermoplastic layer on the first portion of the fusible member such that the thermoplastic layer encapsulates the first portion and the groove or the aperture. The thermoplastic layer has a first thermoplastic portion disposed on the top surface of the fusible member, and a second thermoplastic portion disposed on the bottom surface of the fusible member. A thickness of the first thermoplastic portion is greater than or equal to the thickness of the fusible member along an axis. The axis extends through the thermoplastic layer and the fusible member and is perpendicular to the top and bottom surfaces of the fusible member. A thickness of the second thermoplastic portion is greater than or equal to the thickness of the fusible member along the axis.

DETAILED DESCRIPTION

Referring to FIGS. 1-5, a battery module 20 in accordance with an exemplary embodiment is illustrated. The battery module 20 includes battery cells 30, 32, 34, 36, 38, 40, 42, 44, 46, 48, 50, 52, 54, 56, 58, 60, 62, 64, 66, 68, 70, 72, 74, 76 and a battery cell interconnect assembly 100.

Figure 1:
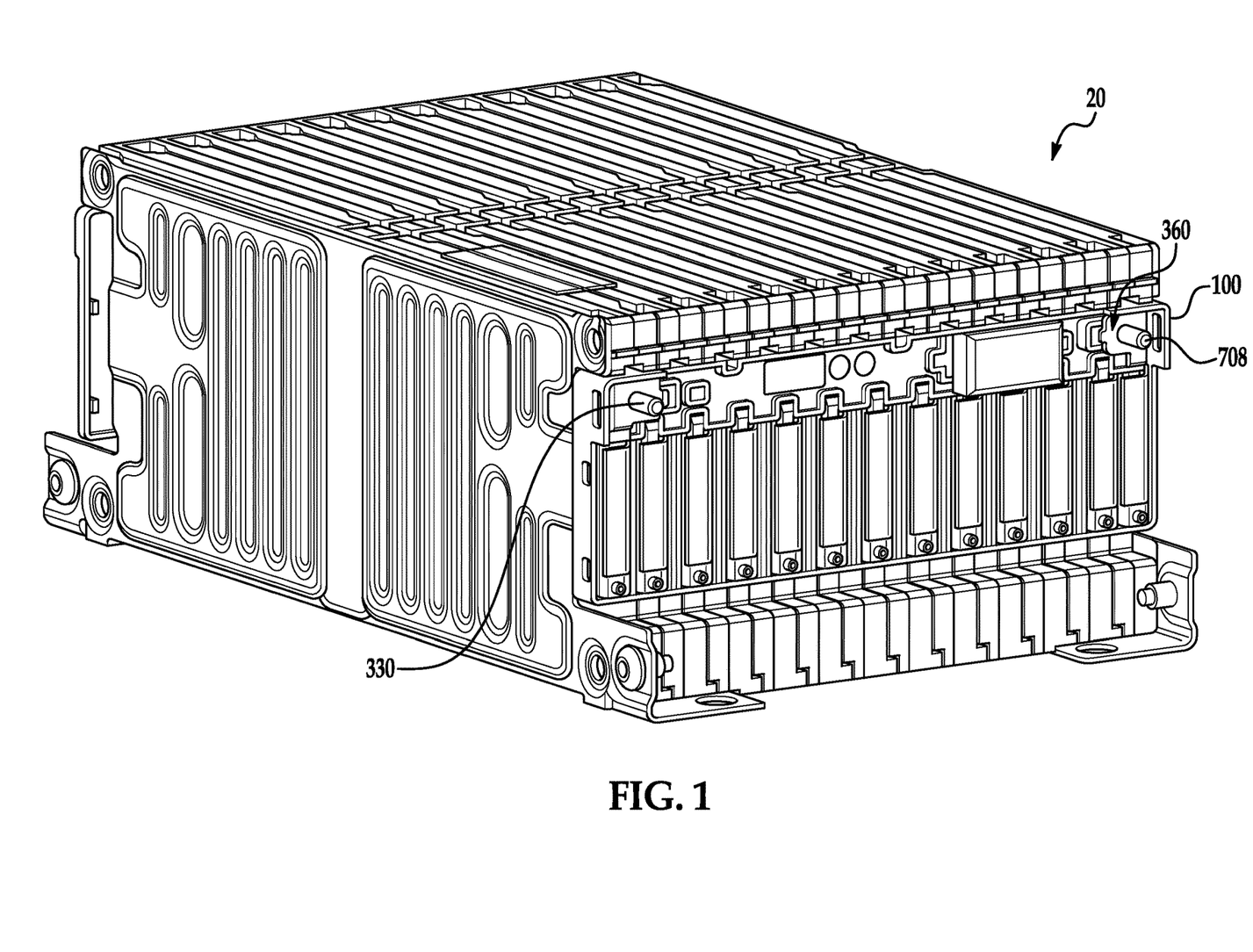
FIG. 1 is a schematic of a battery module.
Figure 6:
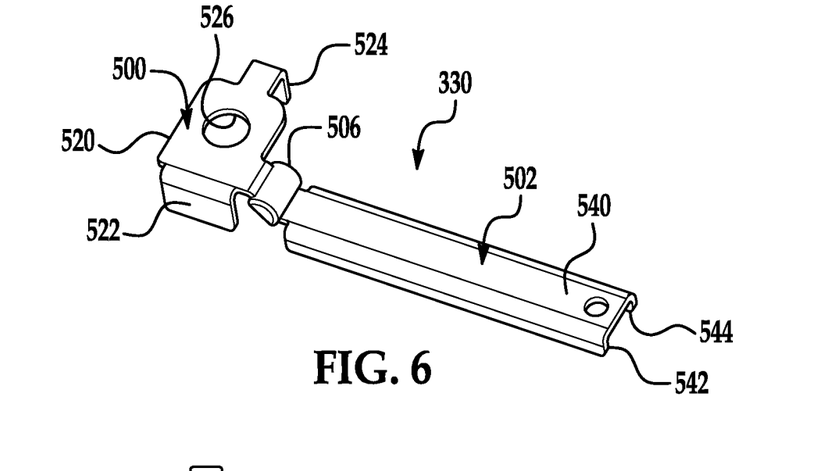
FIG. 6 is a schematic of a terminal busbar utilized in the battery cell interconnect assembly of FIG. 4 in accordance with an exemplary embodiment.
Figure 7:
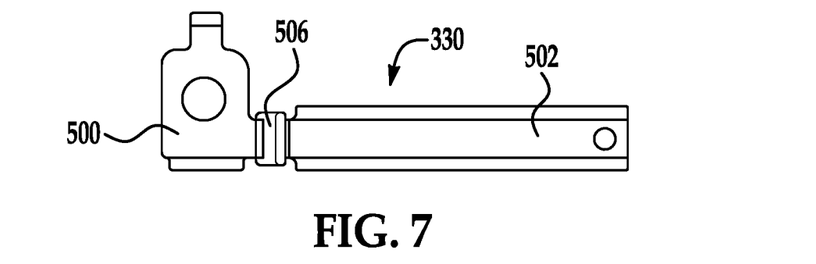
FIG. 7 is a top view of the terminal busbar of FIG. 6.
Figure 8:
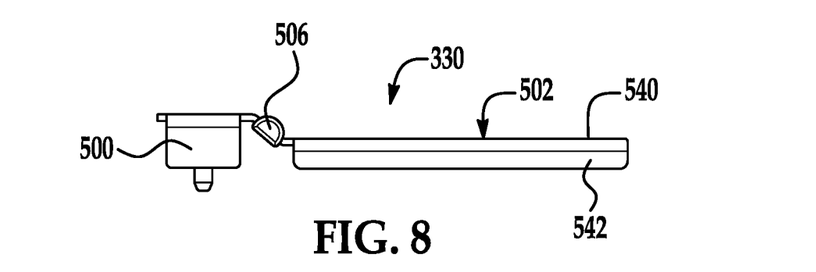
FIG. 8 is a side view of the terminal busbar of FIG. 6.
Figure 9:
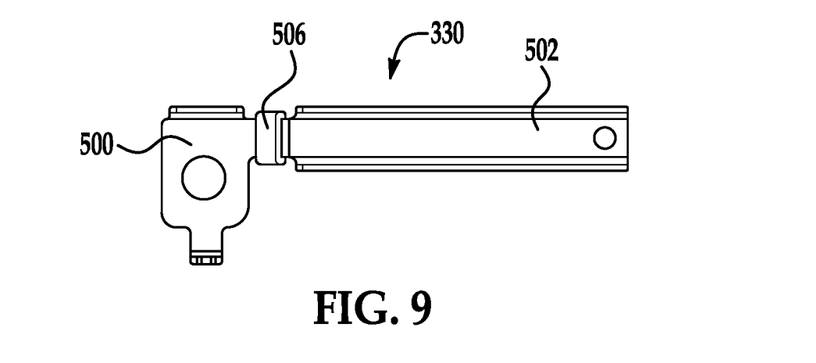
FIG. 9 is a bottom view of the terminal busbar of FIG. 6.
Figure 10:
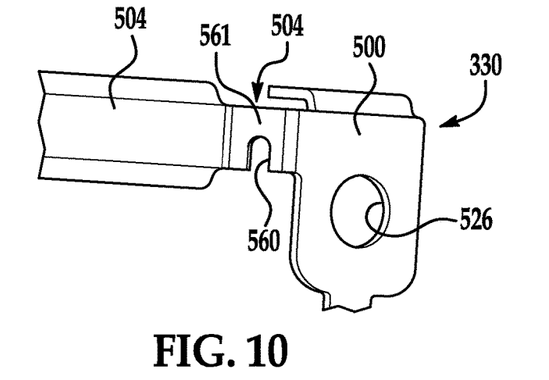
FIG. 10 is an enlarged view of a portion of the terminal busbar of FIG. 6 before an overmolded thermoplastic layer is disposed thereon.
Figure 11:
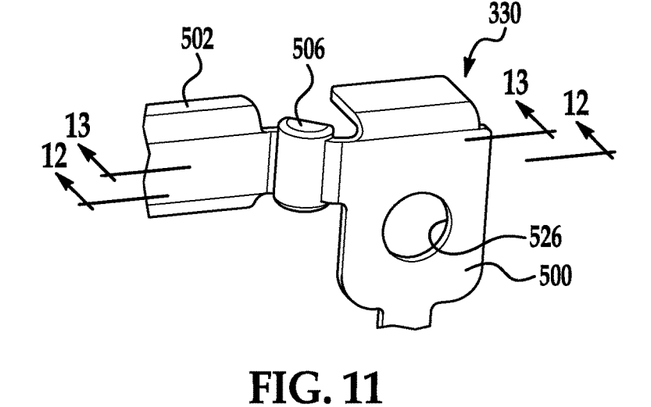
FIG. 11 is another enlarged view of the portion of the terminal busbar of FIG. 6 after the overmolded thermoplastic layer is disposed thereon.

Referring to FIGS. 1, 6, and 10, an advantage of the battery module 20 is that the battery module 20 utilizes a terminal busbar 330 having a fusible member 504 and an overmolded thermoplastic layer 506. When an excessive current is flowing through the fusible member 504 for a time interval, a portion of the fusible member 504 melts to form an open electrical state within the terminal busbar 330 to prevent further excessive current flow which may damage the battery module 20. Further, during the excessive current condition, the overmolded thermoplastic layer 506 prevents melted portions of the fusible member 504 from being dislodged from the overmolded thermoplastic layer 506. Further, the overmolded thermoplastic layer 506 prevents secondary arcing between a melted portion of the fusible member 504 and a remaining portion of the fusible member 504.

For purposes of understanding, a "fusible member" of a terminal busbar is an integrally formed portion of the terminal busbar that has a reduced cross-sectional area utilizing either a groove or an aperture therein to transition from a closed electrical state to an open electrical state when an excessive current level is flowing through the fusible member for a predetermined amount of time.

Figure 2:
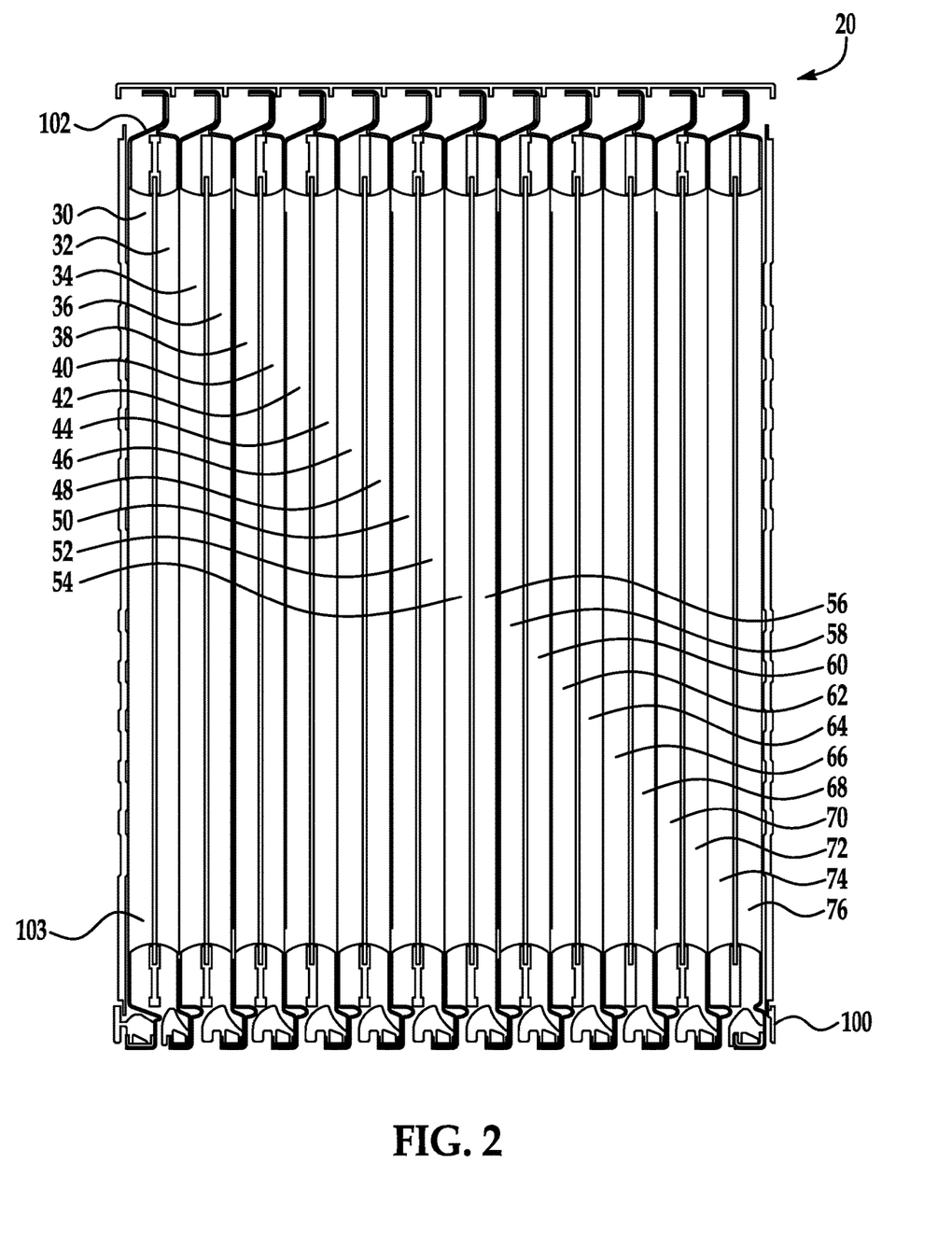
FIG. 2 is a cross-sectional schematic of the battery module of FIG. 1.
Figure 3:
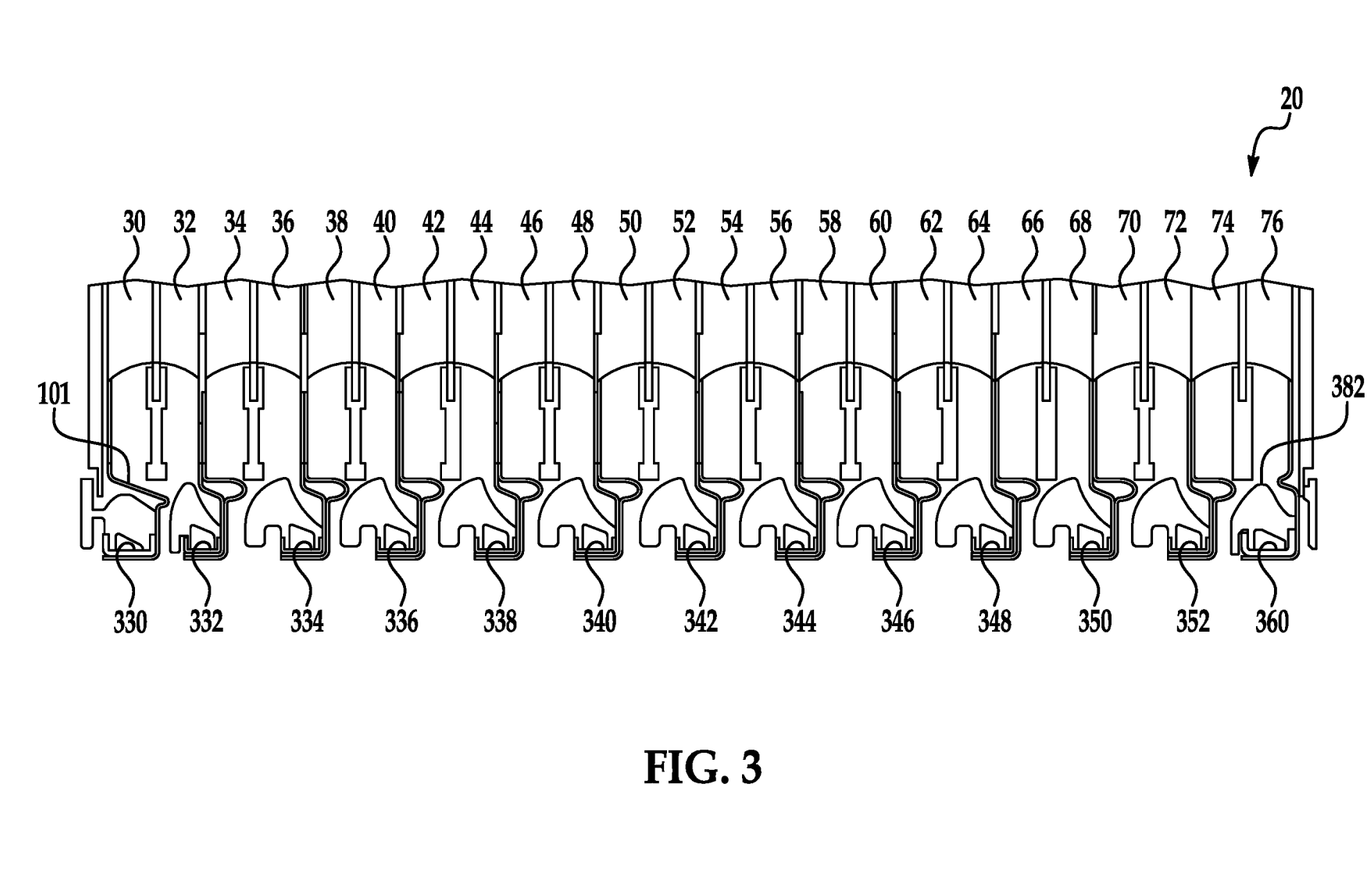
FIG. 3 is an enlarged schematic of a portion of the battery module of FIG. 2.

Referring to FIGS. 2 and 3, each of the battery cells 30-76 have an identical structure, so only the structure the battery cell 30 will be discussed in greater detail herein for purposes of simplicity. The battery cell 30 includes terminals 101, 102 disposed at opposite ends of a pouch body 103. In an exemplary embodiment, the battery cell 30 is a lithium-ion pouch battery cell. Of course, in alternative embodiments the battery cell 30 could comprise other types of battery cells known to those skilled in the art. The battery cells 30-76 are stacked against one another and are electrically coupled in series to one another. The end battery cells 30 and 76 are electrically coupled to the terminal busbars 330, 360 respectively.

Figure 4:
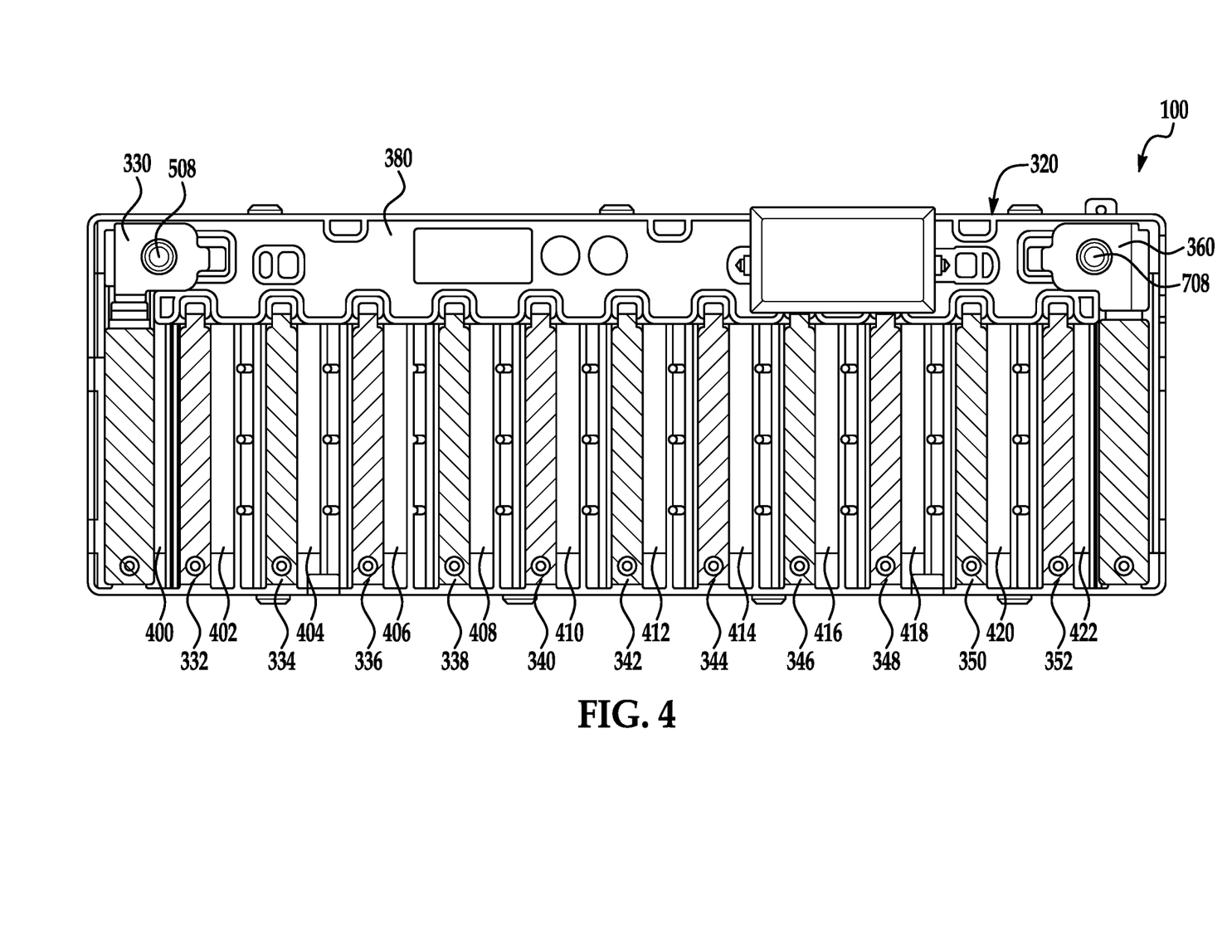
FIG. 4 is a schematic of a battery cell interconnect assembly utilized in the battery module of FIG. 1.
Figure 5:
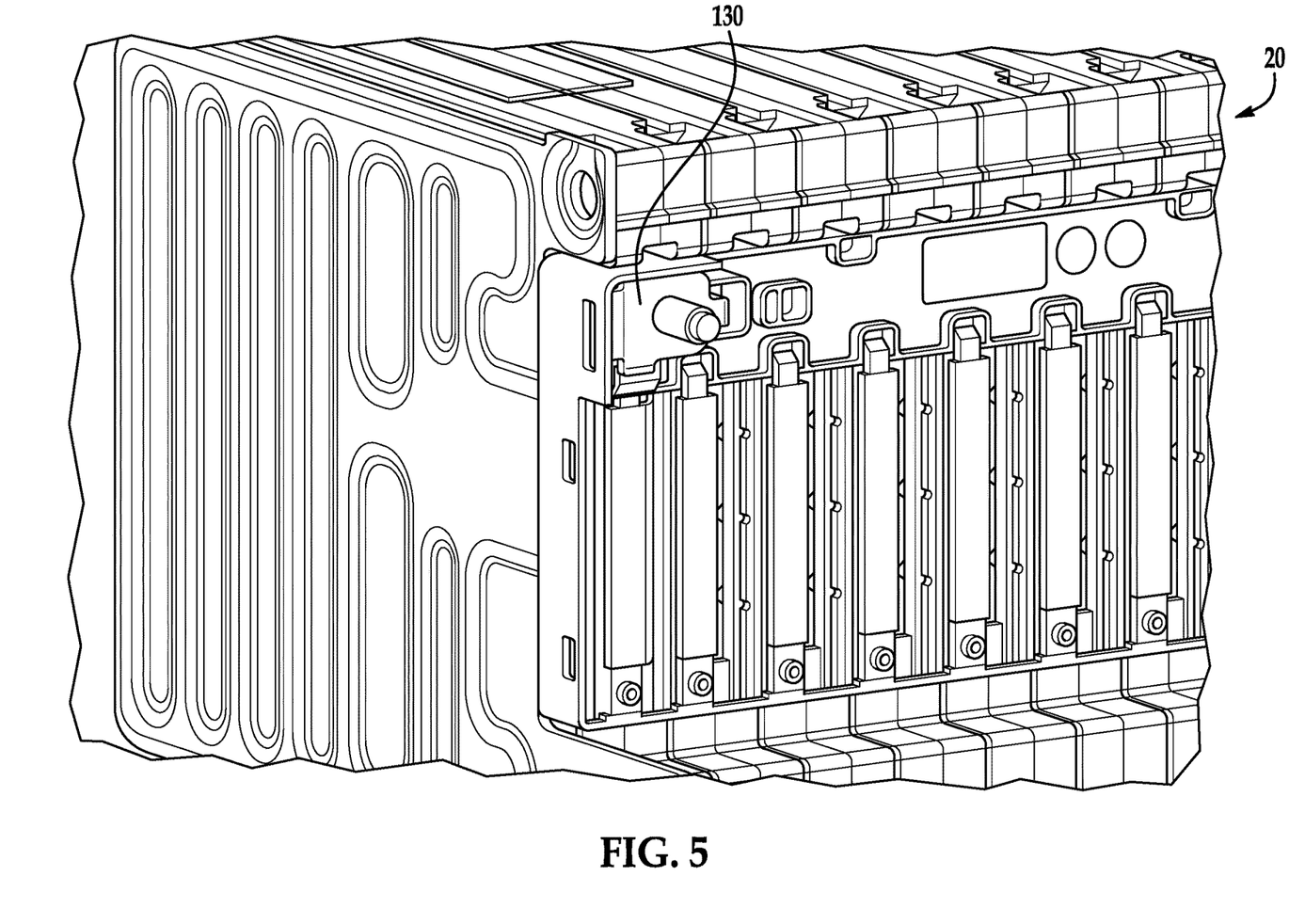
FIG. 5 is an enlarged schematic of a portion of the battery module of FIG. 1.

Referring to FIGS. 2-4, the battery cell interconnect assembly 100 is physically and electrically coupled to terminals of the battery cells 30-76 at a first end of the battery cells 30-76. The battery cell interconnect assembly 100 includes a rectangular plastic body 320, a terminal busbar 330, interconnect members 332, 334, 336, 338, 340, 342, 344, 346, 348, 350, 352, and a terminal busbar 360. It should be understood that another battery cell interconnect assembly (not shown) could be coupled to terminals of the battery cells 30-76 at a second end of the battery cells 30-76.

The rectangular plastic body 320 is provided to hold the remaining components of the battery cell interconnect assembly 100 thereon. The rectangular plastic body 320 includes a top surface 380 and a bottom surface 382 (shown in FIG. 3). Further, the rectangular plastic body 320 includes apertures 400, 402, 404, 406, 408, 410, 412, 414, 416, 418, 420, 422 extending therethrough for receiving associated terminals of the battery cells 30-76 therethrough.

The interconnect members 332-352 are coupled to the rectangular plastic body 320 and are used to connect associated terminals of the battery cells 30-64 to one another. In an exemplary embodiment, the interconnect members 332-352 are constructed of either copper or aluminum.

As illustrated, the interconnect member 332 is disposed adjacent to the apertures 400, 402 and receives terminals from a first end of the battery cells 32, 34 thereon, and the interconnect member 334 is disposed adjacent to the apertures 402, 404 and receives terminals from a first end of the battery cells 36, 38 thereon. Further, the interconnect member 336 is disposed adjacent to apertures 404, 406 and receives terminals from a first end of the battery cells 40, 42 thereon, and the interconnect member 338 is disposed adjacent to apertures 406, 408 and receives terminals from a first end of the battery cells 44, 46 thereon. Also, the interconnect member 340 is disposed adjacent to apertures 408, 410 and receives terminals from a first end of the battery cells 48, 50 thereon, and the interconnect member 342 is disposed adjacent to apertures 410, 412 and receives terminals from a first end of the battery cells 52, 54 thereon. Further, the interconnect member 344 is disposed adjacent to apertures 412, 414 and receives terminals from a first end of the battery cells 56, 58 thereon, and the interconnect member 346 is disposed adjacent to apertures 414, 416 and receives terminals from a first end of the battery cells 60, 62 thereon. Also, the interconnect member 348 is disposed adjacent to apertures 416, 418 and receives terminals from a first end of the battery cells 64, 66 thereon, and the interconnect member 350 is disposed adjacent to apertures 418, 420 and receives terminals from a first end of the battery cells 68, 70 thereon. Further, the interconnect member 352 is disposed adjacent to apertures 420, 422 and receives terminals from a first end of the battery cells 72, 74 thereon.

The terminal busbars 330, 360 are disposed on opposite ends of the series stack of the battery cells 30-76 and a voltage between the terminal busbars 330, 360 is equal to the sum of the voltages output by the battery cells 30-76.

Referring to FIGS. 4 and 6-15, the terminal busbar 330 in accordance with an exemplary embodiment will now be explained. The terminal busbar 330 is coupled to the rectangular plastic body 320. The terminal busbar 330 includes a first busbar portion 500, a second busbar portion 502, a fusible member 504, an overmolded thermoplastic layer 506, and a post 508 (shown in FIG. 4), and an axis 510 (shown in FIG. 12). In an exemplary embodiment, the first busbar portion 500, the second busbar portion 502, and the fusible member 504 are integrally formed with one another from a single sheet of metal such as copper or aluminum for example, and are electrically conductive.

An advantage of the terminal busbar 330 is that the busbar 330 utilizes the fusible member 504 and the overmolded thermoplastic layer 506. When an excessive current is flowing through the fusible member 504 for a time interval, a portion of the fusible member 504 melts to form an open electrical state within the terminal busbar 330 to prevent further excessive current flow which may damage the battery module 20. Further, during the excessive current condition, the overmolded thermoplastic layer 506 prevents melted portions of the fusible member 504 from being dislodged from the overmolded thermoplastic layer 506. Further, the overmolded thermoplastic layer 506 prevents secondary arcing between a melted portion of the fusible member 504 and a remaining portion of the fusible member 504.

The first busbar portion 500 has a coupling plate 520, first and second tab portions 522, 524, and a hole 526. The first and second tab portions 522, 524 are disposed on opposite ends of the coupling plate 520 and extend substantially perpendicular to the coupling plate 520. The first and second tab portions 522, 524 are utilized to couple the terminal busbar 330 to the rectangular plastic body 320. The hole 526 is sized and shaped to receive the post 508 (shown in FIG. 4) therethrough. The post 508 is physically and electrically coupled to the coupling plate 520 and extends substantially perpendicular to the coupling plate 520.

The second busbar portion 502 has a top plate portion 540 and first and second side plate portions 542, 544. The first and second side plate portions 542, 544 are coupled to opposite sides of the top plate portion 540 and extend downwardly and substantially perpendicular to the top plate portion 540. The U-shaped configuration of the second busbar portion 502 that includes the top plate portion 540 and the first and second side plate portions 542, 544 allows for an increased surface area for welding the terminals of associated battery cells thereon.

The fusible member 504 is coupled to and between the coupling plate 520 of the first busbar portion 500 and the top plate portion 540 of the second busbar portion 502. The fusible member 504 has a top surface 570, a bottom surface 572, and a portion 562 with a groove 560 disposed therein having a decreased cross-sectional area. The portion 561 melts when an excessive current (e.g., current flow during a short-circuit condition of the battery module 20) is flowing through the terminal busbar 330 for a time interval such that portion 562 transitions to an open electrical state (e.g., acts like an electrical fuse) to prevent further current flow. The portion 561 has a cross-sectional area that is less than the cross-sectional area of other portions of the fusible member 504, so that the portion 561 is a first portion of the fusible member 504 to melt when an excessive current is flowing through the fusible member 504 for a time interval.

Figure 12:
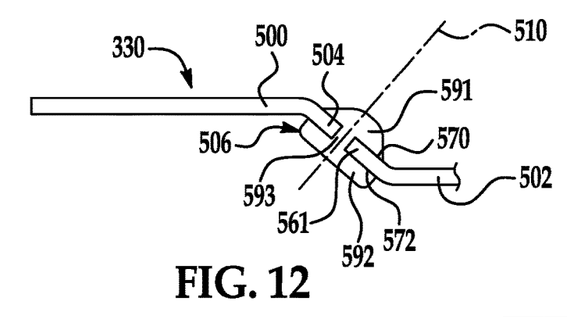
FIG. 12 is a cross-sectional schematic of a portion of the terminal busbar of FIG. 11 taken along lines 12-12, that illustrates a groove therein.
Figure 13:
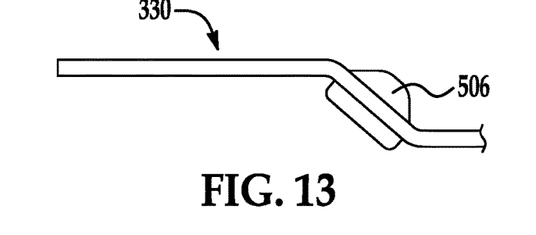
FIG. 13 is a cross-sectional schematic of a portion of the terminal busbar of FIG. 11 taken along lines 13-13, that illustrates a fusible portion of a fusible member.

The overmolded thermoplastic layer 506 is provided to prevent a melted portion (e.g., melted portion of portion 561) of the fusible member 504 from being dislodged outside of the overmolded thermoplastic layer 506 and to prevent secondary arcing between the melted portion and a remaining portion of the fusible member 504. The overmolded thermoplastic layer 506 encapsulates and covers the portion 561 of the fusible member 504 and the groove 560 therein. Referring to FIG. 12, the overmolded thermoplastic layer 506 includes first, second, and third thermoplastic portions 591, 592, 593. The first thermoplastic portion 591 is disposed on the top surface 570 of the fusible member 504 and extends outwardly therefrom. The second thermoplastic portion 592 is disposed on the bottom surface 572 of the fusible member 504 and extends outwardly therefrom. The third thermoplastic portion 593 fills the groove 560. An axis 510 extends through the overmolded thermoplastic layer 506 and the fusible member 504 that is perpendicular to the top surface 570 and the bottom surface 572 of the fusible member 504. The overmolded thermoplastic layer 506 has a thickness along the axis 510 that is greater than a thickness of the fusible member 504 along the axis 510. In particular, a thickness of the first thermoplastic portion 591 is greater than or equal to the thickness of the fusible member 504 along the axis 510. Further, a thickness of the second thermoplastic portion 592 is greater than or equal to the thickness of the fusible member 504 along the axis 510. It is important that the thicknesses of each of the first and second thermoplastic portions 591, 592 are greater than or equal to a thickness of the fusible member 504 along the axis 510 so that the thermoplastic portions 591, 592 have a sufficient volume to flow into a region previously occupied by a melted portion of the fusible member 504 to prevent secondary arcing between the melted portion and a remaining portion of the fusible member 504, and to completely encapsulate the melted portion such that the melted portion is contained within the overmolded thermoplastic layer 506. In an exemplary embodiment, the overmolded thermoplastic layer 506 is an overmolded thermoset plastic layer that has a softening temperature which is less than a melting temperature of the fusible member 504. An advantage of using an overmolded thermoset plastic layer is that a difference between a softening temperature and a higher melting temperature thereof is relatively large which allows the thermoset plastic material layer to soften at the softening temperature and to flow into a region previously occupied by a melted portion of the fusible member 504 to prevent secondary arcing between the melted portion and a remaining portion of the fusible member 504 without dripping off of the fusible member 504.

In summary, during operation, when an electrical current flowing through the terminal busbar 330 exceeds a threshold current level for a time interval, the fusible member 330 melts to form an open electrical state between the first and second busbar portions 500, 502, and the overmolded thermoplastic layer 506 prevents a melted portion of the fusible member 504 from being dislodged from the overmolded thermoplastic layer 506. In particular, when the overmolded thermoset plastic layer 506 reaches a softening temperature, the layer 506 has a softened state, and when the melted portion of the fusible member 504 is formed at a higher melting temperature, the layer 506 flows into a region previously occupied by a melted portion of the fusible member 504 to prevent secondary arcing between the melted portion and a remaining portion of the fusible member 504, and to completely encapsulate the melted portion to prevent the melted portion from being dislodged from the overmolded thermoplastic layer 506.

Referring to FIGS. 1 and 4, the terminal busbar 360 is coupled to the rectangular plastic body 320. The terminal busbar 360 is electrically coupled to the battery cell 76.

Referring to FIGS. 6, 10, 12, 14 and 15, a method for manufacturing the terminal busbar 330 in accordance with another exemplary embodiment will now be explained.

Figure 14:
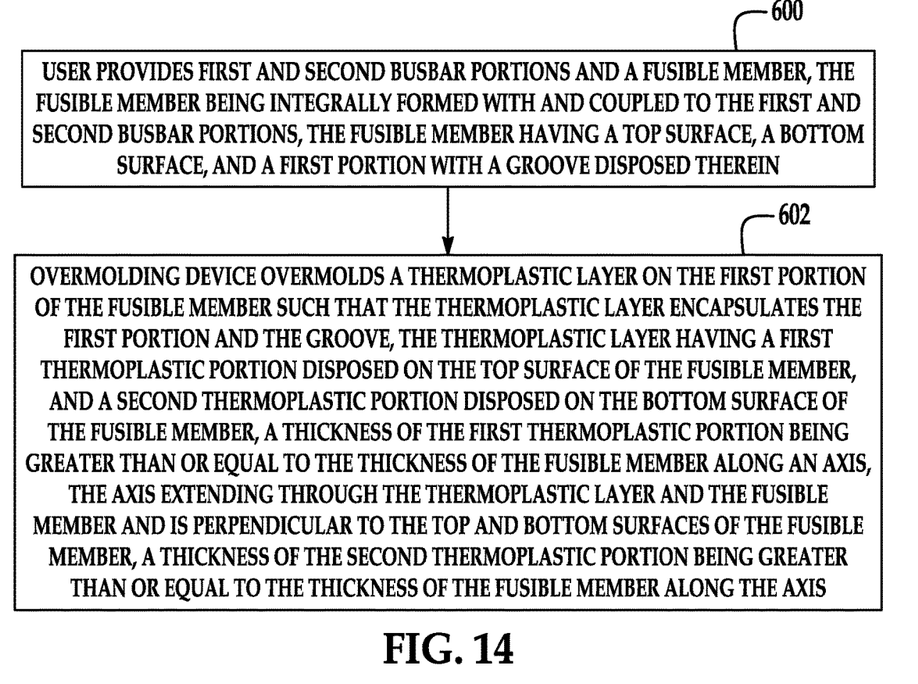
FIG. 14 is a flowchart of a method for manufacturing the terminal busbar of FIG. 1 in accordance with another exemplary embodiment.

At step 600, a user provides the first and second busbar portions 500, 502 and the fusible member 504. The fusible member 504 is integrally formed with and coupled to the first and second busbar portions 500, 502. The fusible member 504 has a top surface 570, a bottom surface 272, and a first portion 561 with a groove 560 (shown in FIG. 10) disposed therein.

Figure 15:
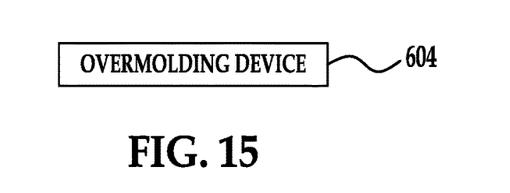
FIG. 15 is a block diagram of an overmolding device utilized to apply the overmolded thermoplastic layer to a terminal busbar.

At step 602, an overmolding device 604 overmolds a thermoplastic layer 506 on the first portion 561 of the fusible member 504 such that the thermoplastic layer 506 encapsulates the first portion 561 and the groove 560. The thermoplastic layer 506 having a first thermoplastic portion 591 disposed on the top surface 570 of the fusible member 504, and a second thermoplastic portion 592 disposed on the bottom surface 572 of the fusible member 504. A thickness of the first thermoplastic portion 591 is greater than or equal to the thickness of the fusible member 504 along an axis 510. The axis 510 extends through the thermoplastic layer 506 and the fusible member 504 and is perpendicular to the top and bottom surfaces 570, 572 of the fusible member 504. A thickness of the second thermoplastic portion 592 is greater than or equal to the thickness of the fusible member 504 along the axis 510.

Figure 17:
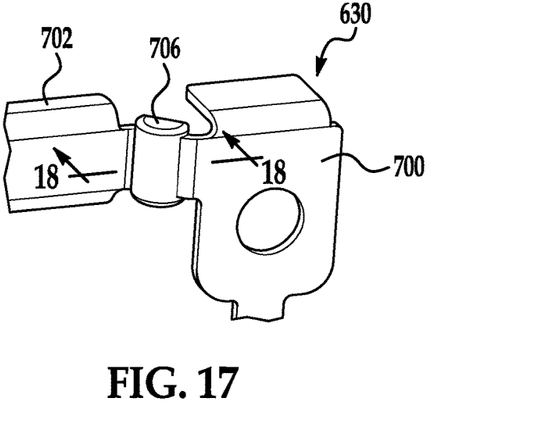
FIG. 17 is a schematic of the terminal busbar of FIG. 16 after the overmolded thermoplastic layer is disposed thereon.
Figure 18:
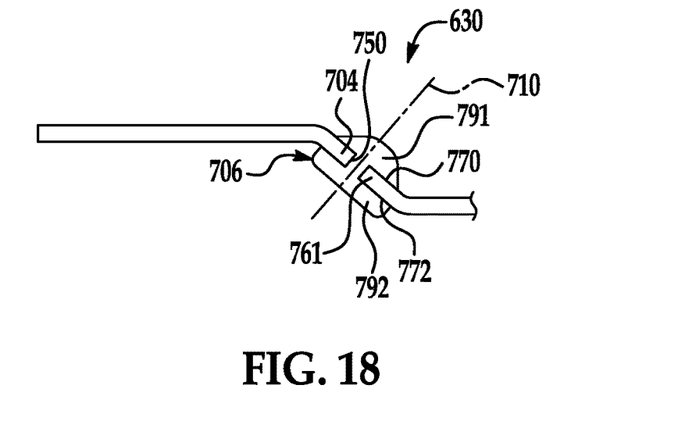
FIG. 18 is a cross-sectional schematic of the terminal busbar of FIG. 17 taken along lines 18-18.

Referring to FIGS. 1, 17 and 18, an alternative terminal busbar 630 that can be utilized in the battery module 20 instead of the terminal busbar 330 is illustrated. The terminal busbar 630 includes a first busbar portion 700, a second busbar portion 702, a fusible member 704, an overmolded thermoplastic layer 706, and a post 708 (shown in FIG. 4). The first busbar portion 700 and the second busbar portion 70 are identical in structure to the first busbar portion 500 and the second busbar portion 502. The thermoplastic layer 706 is substantially identical in structure to the thermoplastic layer 506 except that the thermoplastic layer 705 encapsulates and fills an aperture 750 instead of a groove. Thus, the primary difference between the terminal busbar 630 and the terminal busbar 330 is that the terminal busbar 630 has a first portion 761 with an aperture 750 extending therethrough instead of a groove extending therein. The overmolded thermoplastic layer 706 encapsulates and covers the fusible member 704 and the aperture 750.

Referring to FIGS. 15-19, a method for manufacturing the terminal busbar 630 in accordance with another exemplary embodiment will now be explained.

Figure 16:
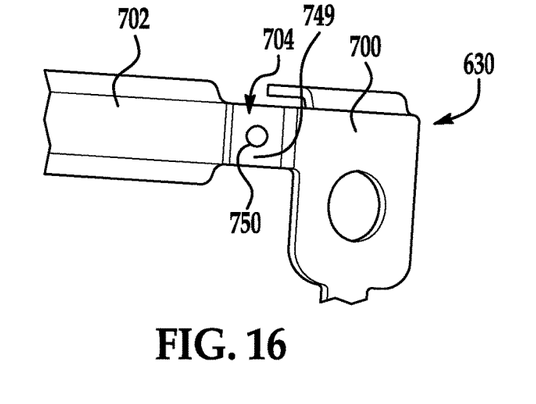
FIG. 16 is a schematic of an alternative embodiment of a terminal busbar having a fusible member with an aperture extending therethrough, before the overmolded thermoplastic layer is disposed thereon.
Figure 19:
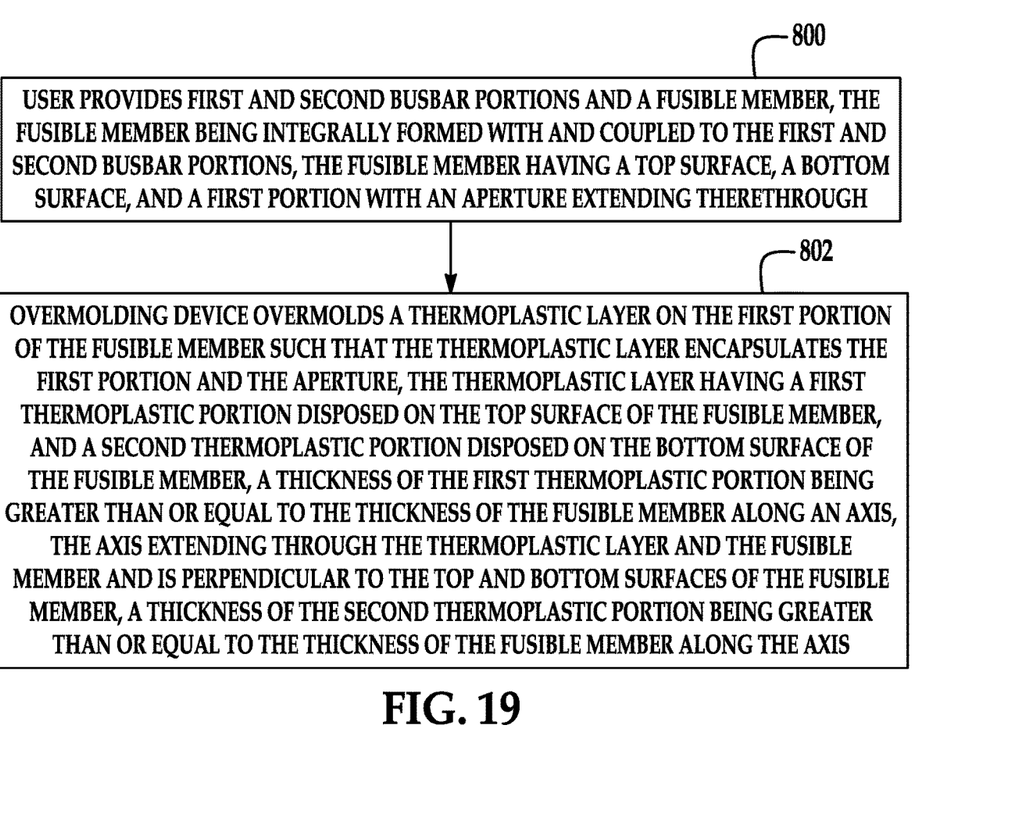
FIG. 19 is a flowchart of a method for manufacturing the terminal busbar of FIG. 17 in accordance with another exemplary embodiment.

At step 800, a user provides the first and second busbar portions 700, 702 and the fusible member 704. The fusible member 704 is integrally formed with and coupled to the first and second busbar portions 700, 702. The fusible member 704 has a top surface 770, a bottom surface 772, and a first portion 761 with an aperture 750 extending therethrough.

At step 802, the overmolding device 604 overmolds a thermoplastic layer 706 on the first portion 749 of the fusible member 704 such that the thermoplastic layer 706 encapsulates the first portion 761 and the aperture 750. The thermoplastic layer 706 having a first thermoplastic portion 791 disposed on the top surface 770 of the fusible member 704, and a second thermoplastic portion 792 disposed on the bottom surface 772 of the fusible member 704. A thickness of the first thermoplastic portion 791 is greater than or equal to the thickness of the fusible member 704 along an axis 710. The axis 710 extends through the thermoplastic layer 706 and the fusible member 704 and is perpendicular to the top and bottom surfaces 770, 772 of the fusible member 704. A thickness of the second thermoplastic portion 792 is greater than or equal to the thickness of the fusible member 704 along the axis 710.

Each inventive terminal busbar described herein provides a substantial advantage over other terminal busbars. In particular, an advantage of each inventive terminal busbar is that the terminal busbar has a fusible member and an overmolded thermoplastic layer. When an excessive current is flowing through the fusible member for a time interval, a portion of the fusible member melts to form an open electrical state within the terminal busbar to prevent further excessive current flow which may damage the battery module. Further, during the excessive current condition, the overmolded thermoplastic layer prevents melted portions of the fusible member from being dislodged from the overmolded thermoplastic layer. Further, the overmolded thermoplastic layer prevents secondary arcing between a melted portion of the fusible member and a remaining portion of the fusible member.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A terminal busbar, comprising:
a first busbar portion having a coupling plate;
a second busbar portion having a top plate portion and first and second side plate portions coupled to and extending downwardly from the top plate portion;
a fusible member coupled to and between the coupling plate of the first busbar portion and the top plate portion of the second busbar portion and being electrically conductive, the fusible member having a top surface, a bottom surface, and a first portion with a groove or an aperture extending therethrough;
the first busbar portion, the second busbar portion, and the fusible member being integrally formed with one another from a single sheet;
an overmolded thermoplastic layer encapsulating the first portion of the fusible member and the groove or the aperture, the overmolded thermoplastic layer having a first thermoplastic portion disposed on the top surface of the fusible member, and a second thermoplastic portion disposed on the bottom surface of the fusible member, a thickness of the first thermoplastic portion being greater than or equal to the thickness of the fusible member along an axis, the axis extending through the overmolded thermoplastic layer and the fusible member and is perpendicular to the top and bottom surfaces of the fusible member, a thickness of the second thermoplastic portion being greater than or equal to the thickness of the fusible member along the axis.

2. The terminal busbar of claim 1, wherein when an electrical current flowing through the terminal busbar exceeds a threshold current level, the fusible member melting to form an open electrical state between the first and second busbar portions, and the overmolded thermoplastic layer preventing a melted portion of the fusible member from being dislodged from the overmolded thermoplastic layer and prevents secondary arcing between the melted portion and a remaining portion of the fusible member.

3. The terminal busbar of claim 1, wherein the overmolded thermoplastic layer is an overmolded thermoset plastic layer.

4. The terminal busbar of claim 1, wherein the overmolded thermoplastic layer has a softening temperature that is less than a melting temperature of the fusible member.

5. The terminal busbar of claim 4, wherein the overmolded thermoplastic layer has a softened state at the softening temperature, and when the melted portion of the fusible member is formed at the melting temperature, the overmolded thermoplastic layer flows into a space previously occupied by the melted portion and encapsulates the melted portion to prevent the melted portion from being dislodged from the thermoplastic layer and to prevent secondary arcing between the melted portion and a remaining portion of the fusible member.

6. The terminal busbar of claim 1, wherein the first and second busbar portions and the fusible member are constructed of copper.

7. The terminal busbar of claim 1, wherein the first and second busbar portions and the fusible member are constructed of aluminum.

8. The terminal busbar of claim 1, wherein the coupling plate has a hole extending therethrough, the hole being sized and shaped receive a battery post therethrough.

9. A method for manufacturing a terminal busbar, comprising:
providing first and second busbar portions and a fusible member that are integrally formed with one another from a single sheet, the fusible member having a top surface, a bottom surface, and a first portion with a groove or an aperture disposed therein; and
overmolding a thermoplastic layer on the first portion of the fusible member such that the thermoplastic layer encapsulates the first portion and the groove or the aperture, the thermoplastic layer having a first thermoplastic portion disposed on the top surface of the fusible member, and a second thermoplastic portion disposed on the bottom surface of the fusible member, a thickness of the first thermoplastic portion being greater than or equal to the thickness of the fusible member along an axis, the axis extending through the thermoplastic layer and the fusible member and is perpendicular to the top and bottom surfaces of the fusible member, a thickness of the second thermoplastic portion being greater than or equal to the thickness of the fusible member along the axis.

10. The method of claim 9, wherein the thermoplastic layer is an overmolded thermoset plastic layer.

11. The method of claim 9, wherein the thermoplastic layer has a softening temperature that is less than a melting temperature of the fusible member.

12. The method of claim 11, wherein the thermoplastic layer has a softened state at the softening temperature, and when the melted portion of the fusible member is formed at the melting temperature, the thermoplastic layer flows into a space previously occupied by the melted portion and encapsulates the melted portion to prevent the melted portion from being dislodged from the thermoplastic layer and to prevent secondary arcing between the melted portion and a remaining portion of the fusible member.

13. The method of claim 9, wherein the first and second busbar portions and the fusible member are constructed of copper.

14. The method of claim 9, wherein the first and second busbar portions and the fusible member are constructed of aluminum.

15. A terminal busbar, comprising:
a first busbar portion having a coupling plate;
a second busbar portion having a top plate portion and first and second side plate portions coupled to and extending downwardly from the top plate portion to form a U-shaped configuration;
a fusible member coupled to and between the coupling plate of the first busbar portion and the top plate portion of the second busbar portion and being electrically conductive, the fusible member having a top surface, a bottom surface, and a first portion with a groove or an aperture extending therethrough;
the first busbar portion, the second busbar portion, and the fusible member being integrally formed with one another from a single metal sheet;
an overmolded thermoplastic layer encapsulating the first portion of the fusible member and the groove or the aperture, the overmolded thermoplastic layer having a first thermoplastic portion disposed on the top surface of the fusible member, and a second thermoplastic portion disposed on the bottom surface of the fusible member, a thickness of the first thermoplastic portion being greater than or equal to the thickness of the fusible member along an axis, the axis extending through the overmolded thermoplastic layer and the fusible member and is perpendicular to the top and bottom surfaces of the fusible member, a thickness of the second thermoplastic portion being greater than or equal to the thickness of the fusible member along the axis.

* * * * *